United States Patent [19]
Nishikawa

[11] Patent Number: 5,697,652
[45] Date of Patent: Dec. 16, 1997

[54] PIPE JOINT ASSEMBLY

[75] Inventor: Masahiro Nishikawa, Okazaki, Japan

[73] Assignee: Maruyasu Kogkyo Kabushiki Kaisha, Aichi-ken, Japan

[21] Appl. No.: 703,451

[22] Filed: Aug. 27, 1996

[30] Foreign Application Priority Data

Aug. 28, 1995 [JP] Japan ................. 7-219186

[51] Int. Cl.⁶ ........................................... F16L 37/18
[52] U.S. Cl. .................... 285/314; 285/93; 285/175; 285/320; 285/423
[58] Field of Search ................. 285/93, 34, 35, 285/314, 322, 323, 319, 306, 175, 320, 423

[56] References Cited

U.S. PATENT DOCUMENTS

| | | | |
|---|---|---|---|
| 373,292 | 11/1887 | Jacobson et al. | 285/314 |
| 1,966,718 | 7/1934 | Hanson | 285/314 X |
| 2,084,431 | 6/1937 | Catley | 285/314 |
| 5,425,558 | 6/1995 | Dennany | 285/314 X |

FOREIGN PATENT DOCUMENTS

| | | |
|---|---|---|
| 2-128889 | 10/1990 | Japan . |
| 4296291 | 10/1992 | Japan ................. 285/314 |
| 1742573 | 6/1992 | Russian Federation ......... 285/314 |

Primary Examiner—Dave W. Arola
Attorney, Agent, or Firm—Hazel & Thomas

[57] ABSTRACT

A pipe joint assembly of the type including a joint body formed with a stepped bore the small diameter portion of which is formed to be coupled with a pipe inserted therein, a retainer sleeve member having a cylindrical portion coupled within the larger diameter portion of the stepped bore and a pair of diametrically opposed clamp arms integrally formed with the cylindrical portion and engaged at their external faces with corresponding radial openings of the joint body and at their internal faces with an annular projection of the pipe, and a detachment socket having an annular body portion located in surrounding relationship with the pipe, a plurality of arm portions extended in parallel from the annular body portion in an axial direction and coupled with the joint body and a plurality of leg portions extended in parallel from the annular body portion at each position circumferentially spaced from the arm portions to be located in a space between the clamp arms of the sleeve member. When the detachment socket is rotated for removing the pipe from the joint body, the leg portions of the socket are interposed between the clamp arms of the sleeve member end an outer periphery of the pipe to disengage the clamp arms from the annular projection of the pipe. After removal of the pipe, the detachment socket is automatically returned to the initial position and retained in place on the joint body.

2 Claims, 6 Drawing Sheets

PIPE JOINT ASSEMBLY

BACKGROUND OF THE INVENTION

1. Field of the Invention

The present invention relates to a pipe joint assembly adapted for use in piping in automotive vehicles.

2. Description of the Prior Art

Disclosed in Japanese Utility Laid-open Publication No. 2(1990)-128889 is a pipe joint assembly of the type as shown in FIG. 7. The conventional pipe joint assembly includes a joint body 61 formed with a stepped bore and a pair of diametrically opposed radial openings 61a and a retainer sleeve member 62 having a cylindrical portion 62a coupled within the joint body 61 and a pair of diametrically opposed clamp arms 62b integrally formed with the cylindrical portion 62a and engaged with the radial openings 61a of joint body 61. In the pipe joint assembly, a pipe 63 is coupled with the joint body 61, and annular sealing members 64 are interposed between an internal surface of joint body 61 and the pipe 63. The sealing members 64 are retained in place by engagement with an inner end of retainer sleeve member 62, and the pipe 63 is retained by engagement with the clamp arms 62b of retainer sleeve member 62 at an annular projection 63a formed thereon. The pipe joint assembly further includes a detachment socket 65 which has an annular body portion 65a in surrounding relationship with the pipe 83, a pair of diametrically opposed leg portions 65b extended from one side of the annular body portion 65a, a pair of clamp arms 65c extended from the one side of annular body portion 65a at each position circumferentially spaced from the leg portions 85b and a grip portion 85d integrally formed with the other side of annular body portion 85a.

The detachment socket 85 is coupled with the joint body 61 in such a manner that the arm portions 65c are engaged with an annular groove formed on an end portion of joint body 62. When it is desired to remove the pipe 63 from the joint body 61, the grip portion of detachment socket 65 is grasped by hand or a tool to disengage the arm portions 65c from the joint body 61 and is pushed to insert the leg portions 66b into a space between the clamp arms 65b of retainer sleeve member 62. Thereafter, the detachment socket 65 is rotated to engage the leg portions 65b with the internal surfaces of clamp arms 62b of retainer sleeve member 62. As a result, the engagement of clamp arms 62b with the pipe 63 is released to permit removal of the pipe 63 from the joint body 61. Such operation of the detachment socket 65 for removal of the pipe 83 is, however, troublesome for the user. In addition, the detachment socket 65 is separated from the joint body 61 after removal of the pipe 63. It is, therefore, required for the user to couple the detachment socket 65 with the joint body 61 when the pipe 63 is inserted Into the joint body 61 for connection thereto. This also results in trouble in operation of the detachment socket 65 for connection of the pipe 63.

SUMMARY OF THE INVENTION

It is, therefore, a primary object of the present invention to provide a pipe joint assembly capable of solving the problems discussed above.

According to the present invention, the object is accomplished by providing a pipe joint assembly of the type which includes a joint body formed with an outward cylindrical bore of large diameter and an inward cylindrical bore of small diameter and formed with a plurality of circumferentially spaced radial openings at an intermediate portion of the outward cylindrical bore, a retainer sleeve member having a cylindrical portion coupled within the outward cylindrical bore of the joint body and a plurality of clamp arms integrally formed with the cylindrical portion and engaged at their external faces with the radial openings of the joint body and at their internal faces with an annular projection of a pipe coupled within the inward cylindrical bore of the joint body, an annular sealing member disposed within the outward cylindrical bore of the joint body in surrounding relationship with the pipe and retained in place by engagement with an inner end of the cylindrical portion of the retainer sleeve member, and a detachment socket having an annular body portion located in surrounding relationship with the pipe, a plurality of arm portions extended in parallel from the annular body portion in an axial direction and coupled with, the joint body and a plurality of leg portions extended in parallel from the annular body portion at each position circumferentially spaced from the arm portions, wherein the arm portions of the detachment socket each are formed with an inward projection which is engaged with an annular stepped portion of the joint body to retain the detachment socket in place when it is rotated for removing the pipe from the joint body, wherein the leg portions of the detachment socket each are located to be interposed between the clamp arms of the retainer sleeve member and an outer periphery of the pipe when the detachment socket is rotated for removing the pipe from the joint body, and wherein the clamp arms of the retainer sleeve member each are formed at one side thereof with a radially outwardly tapered inner surface, while the leg portions of the detachment socket each are formed at one side thereof with a radially inwardly tapered outer surface in a width direction to be engaged with the tapered inner surface of each of the clamp arms.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
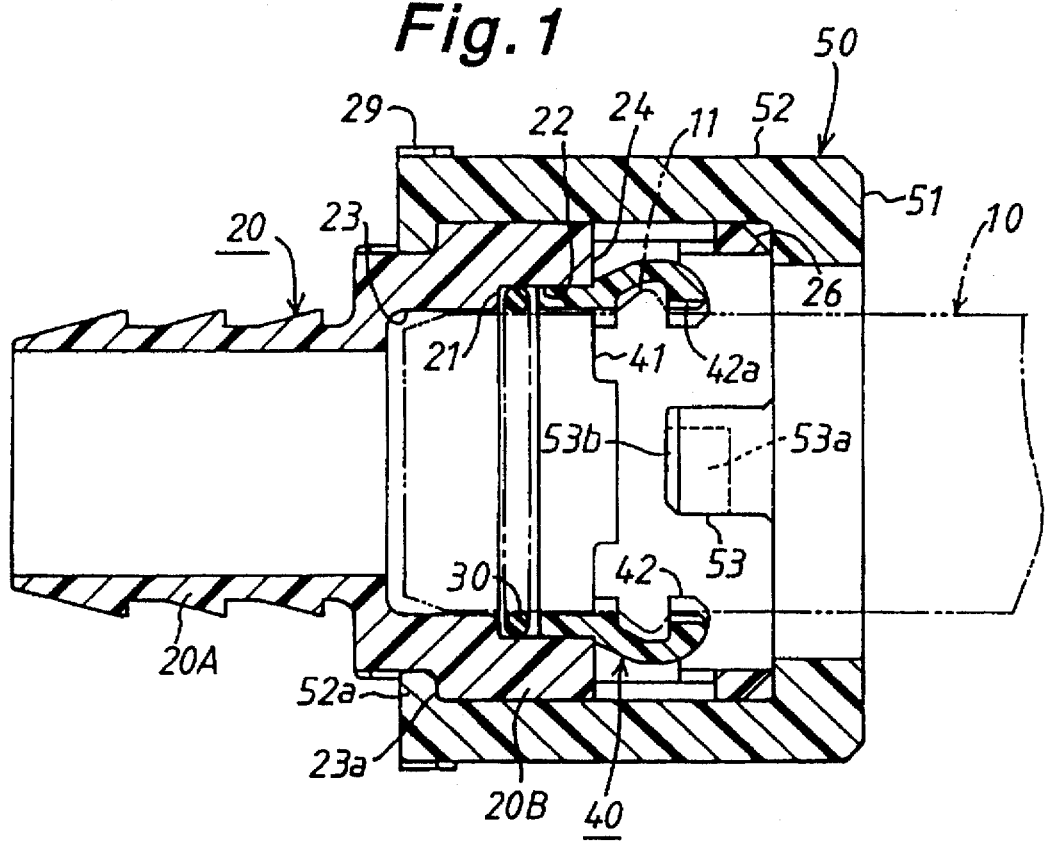
FIG. 1 is a sectional view of a pipe joint assembly in accordance with the present invention.

Illustrated in FIG. 1 of the drawings is a preferred embodiment of a pipe joint assembly in accordance with the present invention which includes a joint body 20 to be coupled with a fluid pipe 10, a sealing member in the form of an O-ring 80 disposed within the joint body 20, a retainer sleeve member 40 coupled within the joint body 20 to retain the O-ring 80 and the fluid pipe 10 in place and a detachment socket 50 coupled with the joint body 20 to be operated for removal of the fluid pipe 10 from the joint body 20.

Figure 2:
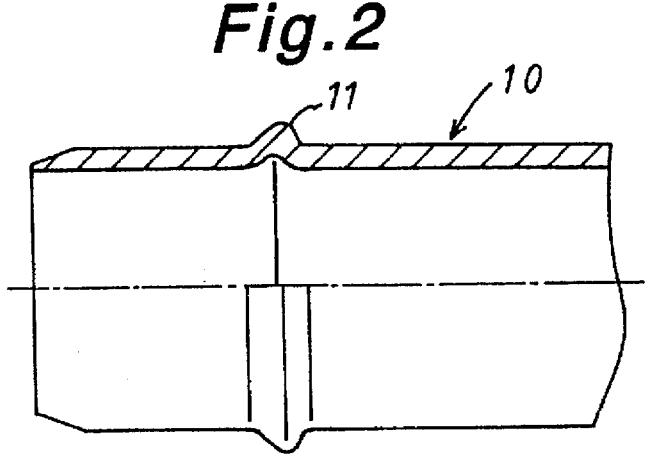
FIG. 2 is a partly sectional view of a pipe shown in FIG. 1.

As shown in FIGS. 1 and 2, the fluid pipe 10 is made of metal or hard synthetic resin and tapered at its distal end. The fluid pipe 20 is integrally formed with an annular projection 11 which has a gentle tapered surface at its forward side and a perpendicular or steep tapered surface at its backward side. The joint body 20 is made of hard synthetic resin such a glass fiber reinforced nylon. As shown in FIGS. 1 and 3(A)–3(C). the joint body 20 has a cylindrical portion 20A for connection to a pipe hose (not shown) and a body portion 20B larger in diameter than the cylindrical portion 20A. The body portion 20B is formed with an outward cylindrical bore 22 of large diameter and an inward cylindrical bore 23 of small diameter to be coupled with the pipe 10. The body portion 20B of joint body 20 is further formed with a pair of diametrically opposed radial openings 24 at an intermediate portion of the outward cylindrical bore 22 and formed at its outer end with a tapered surface 26 slightly larger in width than the radial opening 24.

Figure 3A:
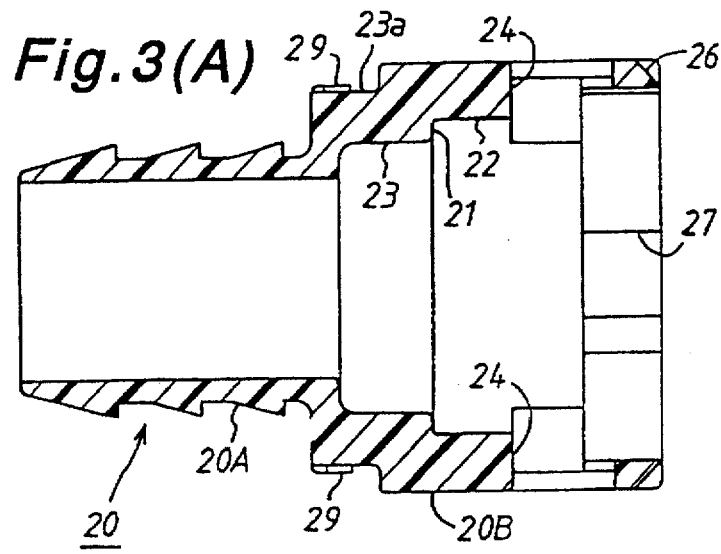
FIG. 3(A) is a sectional view of a joint body shown in FIG. 1.
Figure 3B:
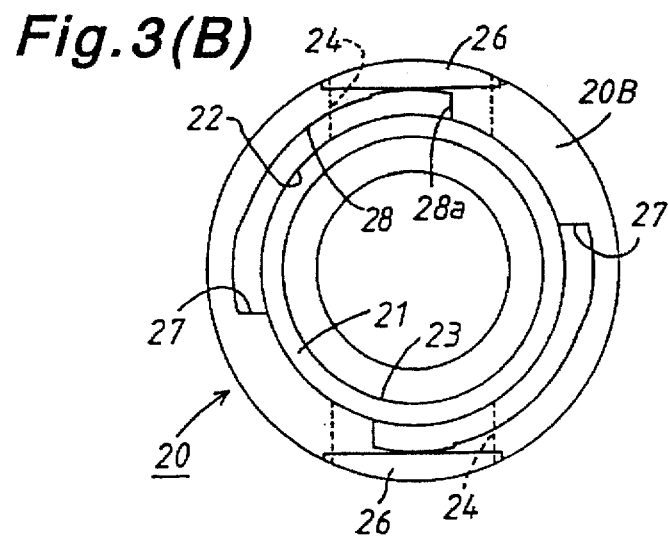
FIG. 3(B) is a front view of the joint body shown in FIG. 3(A)
Figure 3C:
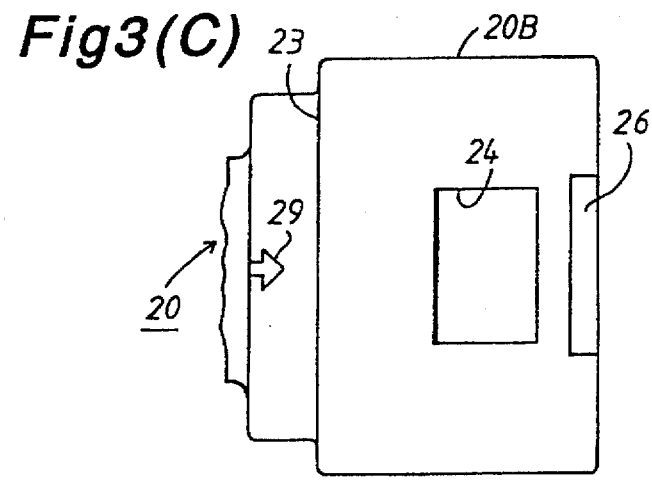
FIG. 3(C) is a plan view of the joint body shown in FIG. 3(A)

As shown in FIGS. 3(B) and 3(C), the outward cylindrical bore 22 is formed at its inner periphery with a pair of diametrically opposed recesses 27 of rectangular shape in cross-section at each position circumferentially spaced from the radial openings 24 at an angle of ninety degrees, a pair of diametrically opposed recesses 28a of the same in shape and depth as the recesses 27, and a pair of diametrically opposed semi-circular grooves 28 slightly shallower than the recesses 27 and 28. The recesses 28a are located inside the respective radial openings 24, and the semicircular grooves 28 are located between the recesses 27 and 28a. The body portion 20B of joint body 20 is formed thereon with an annular stepped portion 23a at a position adjacent the cylindrical portion 20A. A pair of indication marks 29 are provided on the outer surface of the stepped portion 23a for positioning the detachment socket 50 in place. The O-ring 30 is made of elastic material such as synthetic rubber and is positioned by engagement with an annular shoulder 21 between the cylindrical bores 22 and 23.

Figure 4A:
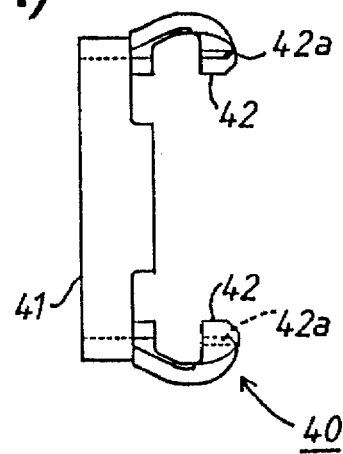
FIG. 4(A) is a side view of a retainer sleeve member shown in FIG. 1.
Figure 4B:
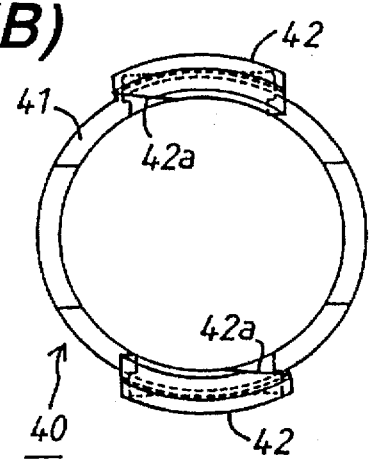
FIG. 4(B) is a front view of the retainer sleeve member shown in FIG. 4(A)
Figure 4C:
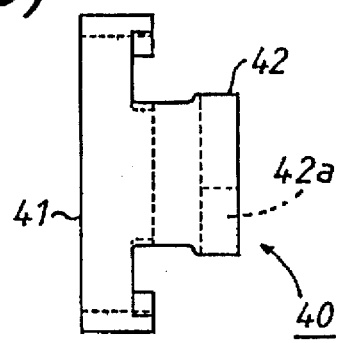
FIG. 4(C) is a plan view of the retainer sleeve member shown in FIG. 4(A)

The retainer sleeve member 40 is made of flexible synthetic resin such as nylon. As shown in FIGS. 1 and 4(A)–4(C), the retainer sleeve member 40 has a cylindrical portion 41 coupled within the, outward cylindrical bore 22 of joint body 20 and a pair of diametrically opposed clamp arms 42 integrally formed with the cylindrical portion 41 and engaged with the radial openings 24 of joint body The outer diameter of cylindrical portion 41 i approximately equal to the inner diameter of the outward cylindrical bore 22, while the inner diameter of cylindrical portion 41 is approximately equal to the outer diameter of pipe 10. The clamp arms 42 of retainer sleeve member 40 are protruded radially outwardly at their outer faces and recessed at their inner faces. As shown in FIG. 4(B), each distal end of the clamp arms 42 is formed at one side thereof with a tapered surface 42a in a width direction. As shown in FIG. 8(A), the tapered surface 42a is inclined at an angle of about seven degrees relative to a reference plane P2 perpendicular to a radial plane P1.

The detachment socket 50 is made of flexible synthetic resin such as polyacetal the stiffness of which is higher than the material of retainer sleeve 40. As shown in FIGS. 1 and 5(A)–5(C), the detachment socket 50 has an annular body portion 51 chamfered at its opposite sides 51a, a pair of diametrically opposed arm portions 52 extended in parallel from the annular body portion 51 in an axial direction and a pair of leg portions 53 extended in parallel from the annular body portion 51 at each position circumferentially spaced from the arm portions 52 at ninety degrees. The arm portions 52 of detachment socket 50 each are slightly larger in width than the radial openings 24 and are formed at its distal end with an inward projection 52a engaged with the annular stepped portion 23a of joint body 20.

Figure 5A:
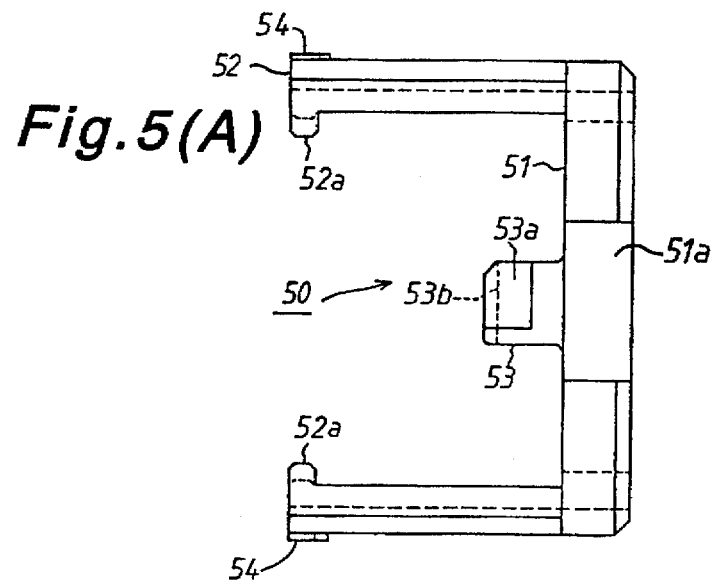
FIG. 5(A) is a side view of a detachment socket shown in FIG. 1.
Figure 5B:
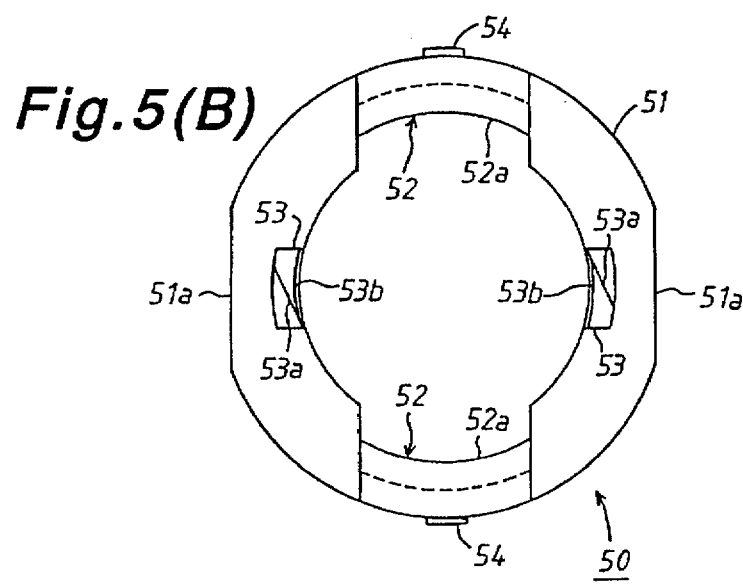
FIG. 5(B) is a front view of the detachment socket shown in FIG. 5(A)
Figure 5C:
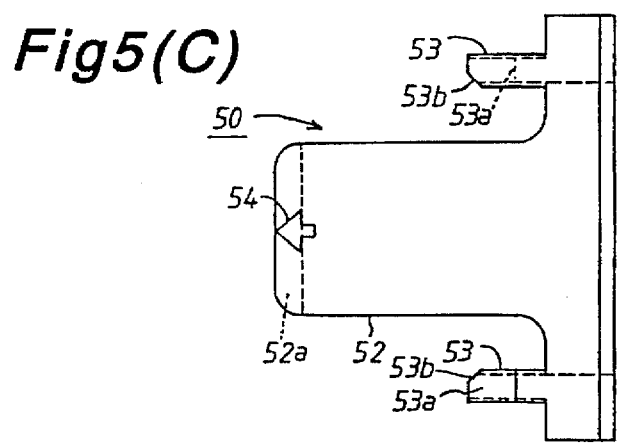
FIG. 5(C) is a plan view of the detachment socket shown in FIG. 5(A)
Figure 6A:
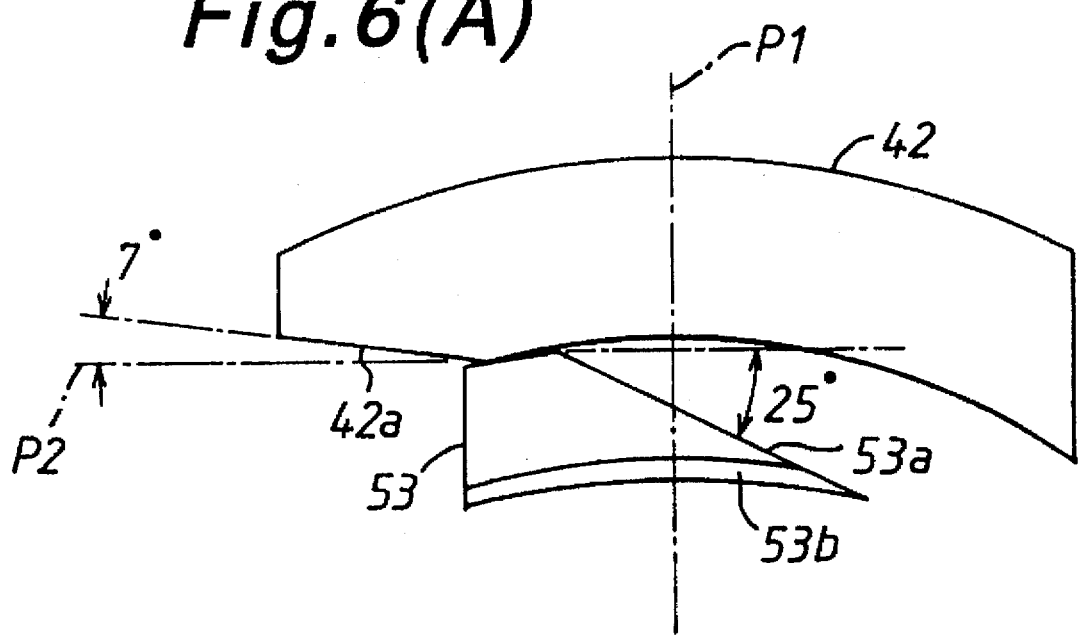
FIGS. 6(A) and 6(B) illustrate movements of a leg portion of the detachment socket relative to a clamp arm of the retainer sleeve member.

As shown in FIG. 5(B), the leg portions 53 of detachment socket 50 each are formed at their one sides with a tapered outer surface 53a in a width direction. As shown in FIG. 6(A), the tapered outer surface 53a of leg portion 53 is radially inwardly inclined at an angle of about twenty five degrees relative to the reference plane P2. The leg portions 53 each are chamfered at their inner peripheral ends 53b and provided thereon with an indication mark 54 respectively to be corresponded with the indication marks 29 on the joint body 20.

During assembly process of the pipe joint assembly, the O-ring 30 is inserted into the outward cylindrical bore 22 of joint body 20, and the cylindrical portion 41 of retainer sleeve member 40 is coupled within the outward cylindrical bore 22 of joint body 20 so that the clamp arms 42 of retainer sleeve member 40 are engaged with the radial openings 24 of joint body 20. In such a condition, the O-ring 30 is retained in place by engagement with the inner end of cylindrical portion 41 of retainer sleeve member 40. Thereafter, the detachment socket 50 is engaged with the tapered surfaces of joint body 20 at its arm portions 52 and pressed into the joint body 20 so that the arm portions 52 are coupled with the annular stepped portion 23a of joint body 20 at their inward projections 52a and that the leg portions 53 of detachment socket 50 are disposed within the corresponding recesses 27 of joint body 20 and located in d space between the clamp arms 42 of retainer sleeve member 40. Thus, the detachment socket 50 is retained in position in the axial direction to be rotatable about the axial line.

When the pipe 10 is inserted into the joint body 20 through the annular portion 51 of detachment socket 50 for connection to the pipe joint assembly, the clamp arms 42 of retainer sleeve member 40 are expanded by the annular projection 11 of pipe 10. When the pipe 10 Is pressed into the inward cylindrical bore 23 of joint body 20, the pipe 10 is retained by engagement with the clamp arms 42 of retainer sleeve member 40 and coupled with the joint body 20. In this instance, the connection of the pipe 10 with the joint body 20 is confirmed by a tone caused by abutment of the clamp arms 42 of retainer sleeve member 40 against the pipe 10.

When the detachment socket 50 is rotated by hand or a tool for removal of the pipe 10 from the joint body the leg portions 53 of detachment socket 50 are rotated along the semi-circular grooves 28 and interposed between the clamp arms 42 of retainer sleeve member 40 and the outer periphery of pipe 10. In this instance, as shown in FIG. 6(A), the leg portions 53 are brought into engagement with the tapered surfaces 42a of clamp arms 42 at their tapered surfaces 53a and coupled with the recesses 28a of joint body 20. Thus, the clamp arms 42 of retainer sleeve member 40 are disengaged from the annular projection 11 of pipe 10 to permit removal of the pipe 10 from the joint body 20, while the leg portions 53 of detachment socket are applied with a radially inward force caused by engagement with the clamp arms 42 of retainer sleeve member When the pipe 10 is removed from the joint body 20, the annular projection 11 of pipe 10 can be Smoothly drawn by engagement with the chamfered surfaces 53b of leg portions 53. After removal of the pipe 10, the detachment socket 50 is retained on the joint body 20.

Figure 6B:
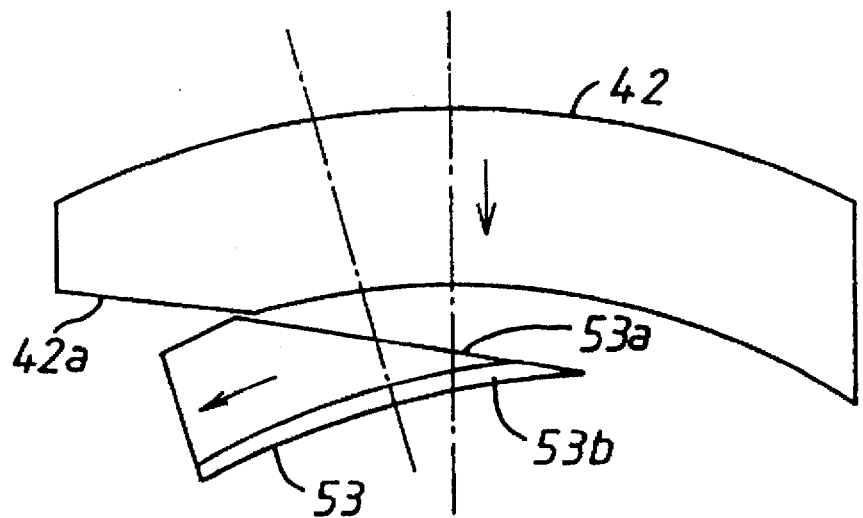
Figure 7:
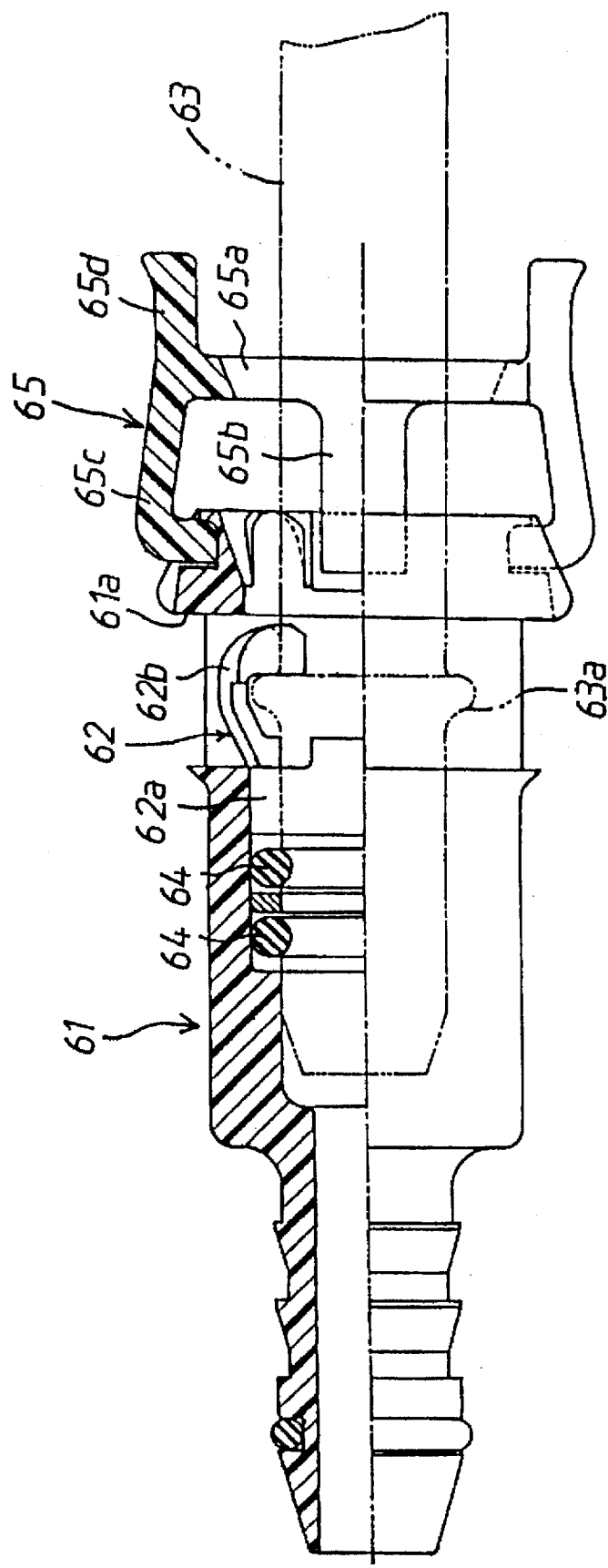
FIG. 7 is a sectional view of a conventional pipe joint assembly.

Since before removal of the pipe 10, the leg portions 53 of detachment socket 50 are being coupled with the recesses 28a and retained by the radially Inward force applied from the clamp arms 42 of retainer sleeve member 40, the engagement of leg portions 53 with the recesses 28a is released upon removal of the pipe 10. In this instance, as shown in FIG. 6(B), the tapered surfaces 53a of leg portions 53 are pressed in a circumferential direction by engagement with the tapered surfaces 42a of clamp arms 42. As a result, the detachment socket 50 is rotated in a reverse direction, and the leg portions 53 of detachment socket 50 are coupled with the recesses 27. Thus, the pipe joint assembly is automatically returned to the initial condition where the pipe 10 is inserted into the joint body 20 through the annular portion 51 of detachment socket 50 for connection to the joint body 20.

As is understood from the above description, the detachment socket 50 is retained on the joint body 20 after removal of the pipe 10 and is automatically returned to the initial position upon removal of the pipe 10. This is useful to solve the problems in the conventional pipe joint assembly discussed above.

What is claimed is:

1. A pipe joint assembly of the type which includes a pipe with an annular projection thereon, a joint body formed with an outward cylindrical bore of large diameter and an inward cylindrical bore of small diameter and formed with a plurality of circumferentially spaced radial openings at an intermediate portion of the outward cylindrical bore, retainer sleeve member having a cylindrical portion coupled within the outward cylindrical bore of said joint body and a plurality of clamp arms integrally formed with the cylindrical portion and engaged at their external faces with the radial openings of said joint body and means at their internal faces for engagement with the annular projection of the pipe coupled within the inward cylindrical bore of said joint body, an annular sealing member disposed within the outward cylindrical bore of said joint body in surrounding relationship with the pipe and retained in place by engagement with an inner end of the cylindrical portion of said retainer sleeve member, and a detachment socket having an annular body portion located in surrounding relationship with the pipe, a plurality of arm portions extended in parallel from the annular body portion in an axial direction and coupled with said joint body and a plurality of leg portions extended in parallel from the annular body portion at each position circumferentially spaced from the arm portions, wherein the arm portions of said detachment socket each are formed with an inward projection which is engaged with an annular stepped portion of said joint body to retain said detachment socket in place when it is rotated for removing the pipe from said joint body, wherein the leg portions of said detachment socket each are located to be interposed between the clamp arms of said retainer sleeve member and an outer periphery of the pipe when said detachment socket is rotated for removing the pipe from said joint body, and wherein the clamp arms of said retainer sleeve member each are formed at one side thereof with a radially outwardly tapered inner surface, while the leg portions of said detachment socket each are formed at one side thereof with a radially inwardly tapered outer surface in a width direction to be engaged with the tapered inner surface of each of said clamp arms when said detachment socket is rotated relative to said joint body so that said leg portions of said detachment socket are urged radially outwardly.

2. A pipe joint assembly as claimed in claim 1, wherein the leg portions of said detachment socket each are chamfered at their inner peripheral ends to permit removal of the annular projection of the pipe therefrom when the pipe is removed from said joint body.

* * * * *